US012030669B2

(12) United States Patent
Cai et al.

(10) Patent No.: US 12,030,669 B2
(45) Date of Patent: Jul. 9, 2024

(54) SYSTEM FOR PROXIMITY REPORTING IN AN ASSEMBLY ENVIRONMENT

(71) Applicant: The Boeing Company, Chicago, IL (US)

(72) Inventors: Fei Cai, Edmonds, WA (US); Farahnaz Sisco, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 263 days.

(21) Appl. No.: 17/527,052

(22) Filed: Nov. 15, 2021

(65) Prior Publication Data
US 2022/0161943 A1 May 26, 2022

Related U.S. Application Data

(60) Provisional application No. 63/117,807, filed on Nov. 24, 2020.

(51) Int. Cl.
*B64F 5/10* (2017.01)
*B25J 9/16* (2006.01)
*G08B 21/18* (2006.01)

(52) U.S. Cl.
CPC .............. *B64F 5/10* (2017.01); *B25J 9/1676* (2013.01); *G08B 21/182* (2013.01)

(58) Field of Classification Search
CPC ......... B64F 5/10; B25J 9/1676; G08B 21/182
USPC .................................................. 340/286.11
See application file for complete search history.

(56) References Cited

U.S. PATENT DOCUMENTS

| 9,424,734 B1* | 8/2016 | Hagi .................. G08B 21/22 |
| 10,789,824 B1* | 9/2020 | Cheng ............. G05B 19/41805 |
| 10,803,714 B1 | 10/2020 | Khera | |
| 2006/0176178 A1* | 8/2006 | Everest ............. G08B 21/0202 |
| | | | 340/8.1 |
| 2013/0015971 A1* | 1/2013 | Caporizzo .......... G08B 13/1427 |
| | | | 340/539.32 |
| 2014/0222521 A1* | 8/2014 | Chait ................ G06Q 10/0633 |
| | | | 705/7.36 |
| 2015/0161872 A1* | 6/2015 | Beaulieu ................. B66C 13/40 |
| | | | 340/686.6 |
| 2017/0255193 A1* | 9/2017 | Berg ..................... G05B 19/048 |
| 2018/0033279 A1* | 2/2018 | Chong ............... G06Q 10/0633 |
| 2018/0232593 A1* | 8/2018 | Tani ........................ F16P 3/142 |
| 2020/0106877 A1 | 4/2020 | Ledvina et al. | |
| 2020/0312112 A1 | 10/2020 | Cheng et al. | |

(Continued)

OTHER PUBLICATIONS

Human-Robot Collaboration in Shared Workspace; https://www.csail.mit.edu/research/human-robot-collaboration-shared-workspace accessed on Nov. 24, 2020.

(Continued)

*Primary Examiner* — Zhen Y Wu
(74) *Attorney, Agent, or Firm* — Quinn IP Law

(57) ABSTRACT

A method and a system can be used for reporting proximity between technicians in an assembly environment. The method includes monitoring, by a proximity server, a distance between a first proximity detector and a second proximity detector based on a first signal and a second signal. The first proximity detector is configured to generate the first signal, and the second proximity detector is configured to generate the second signal.

20 Claims, 7 Drawing Sheets

(56) References Cited

U.S. PATENT DOCUMENTS

2022/0053100 A1* 2/2022 Su .................. H04N 1/00408
2022/0157141 A1* 5/2022 Hasan ............... G08B 29/188

OTHER PUBLICATIONS

Hoyt H286 SVD Personal Safety Voltage Proximity Detector; www.instrumentation2000.com; accessed on Oct. 23, 2020.
Inertial measurement unit; Wikipedia; https://en.wikipedia.org/wiki/Inertial_measurement_unit; accessed on Oct. 23, 2020.
Ultra-wideband; Wikipedia; https://en.wikipedia.org/wiki/Ultra-wideband; accessed on Oct. 23, 2020.

* cited by examiner

SYSTEM FOR PROXIMITY REPORTING IN AN ASSEMBLY ENVIRONMENT

CROSS-REFERENCE TO RELATED APPLICATION

This application claims priority, and the benefit of, U.S. Provisional Patent Application No. 63/117,807 filed on Nov. 24, 2020.

TECHNICAL FIELD

The present disclosure relates to the field of assembly, and in particular, to a system and method for proximity reporting between humans and machines in an assembly environment.

BACKGROUND

In an assembly environment or other environments, it is desirable to maintain physical distance between humans to prevent (or at least minimize the risk of) spreading infectious diseases, such as COVID-19. For instance, in an assembly environment, quite a number of technicians are conglomerated and moving in a specific area. It is therefore useful to inform those technicians whether they are close to one another.

Further, in an assembly environment, it remains desirable to assemble parts as quickly and efficiently as possible. It is not uncommon for certain assembly tasks to be performed by automated machines, while other assembly tasks are performed by human technicians. To ensure safety, technicians are restricted from entering zones of operation of the automated machines while the automated machines are operating. In addition, to ensure safety, the technicians are restricted from becoming too close to other technicians (such as "social distancing" spacing) whether or not automated machines are operating within the zone of operation. This results in "stayout zones" that reduce the speed and efficiency at which the technicians operate, and results in slower assembly rates, which are undesirable. At the same time, it remains best practice not to rely on operator awareness of nearby automated machines or nearby technicians. Hence, automated machines and technicians face restrictions and forced into separate times of use if they both will be utilizing the same zone.

Further complicating this issue, it is difficult to determine whether a technician is present in a zone if the technician is obscured by large parts being worked upon within the zone. For example, a composite part for a wing or fuselage of an aircraft spans many feet, and hence is capable of blocking the technician from view.

Therefore, it would be desirable to have a method and apparatus that take into account at least some of the issues discussed above, as well as other possible issues.

SUMMARY

Embodiments described herein dynamically sense the proximity of a technician to another technician or a machine via multiple sensors (e.g., sensing beacons) that interact with proximity detectors at the machine and the technicians. These sensing beacons are capable of operating in different detection modes (e.g., by utilizing different timing windows or methods of detection).

The present disclosure describes a method for reporting proximity between technicians and machines in an assembly environment. In an aspect of the present disclosure, the method includes monitoring, by a proximity server, a distance between a first proximity detector and a second proximity detector based on a first signal and a second signal. The first proximity detector is configured to generate the first signal, and the second proximity detector is configured to generate the second signal. The method includes determining that the distance between the first proximity detector and the second proximity detector is less than a threshold. The method includes providing, using the first proximity detector, a warning to the first technician in response to determining that the distance between the first proximity detector and the second proximity detector is less than the threshold.

The method includes receiving, by a plurality of sensing beacons disposed in the assembly environment, the first signal from the first proximity detector. The first proximity detector is worn by a first technician. In addition, the method includes receiving, by the plurality of sensing beacons, a second signal from a second proximity detector, wherein the second proximity detector is worn by a second technician.

As discussed above, the first proximity detector is worn by a first technician. The warning provided by the first proximity detector is referred to as a first warning. The method includes providing, using the second proximity detector, a second warning to the second technician in response to determining that the distance between the first proximity detector and the second proximity detector is less than the threshold. The first warning and the second warning are provided at the same time.

Providing the first warning using the first proximity detector includes indicating a direction of a location of the second proximity detector. Providing the second warning using the second proximity detector includes indicating a direction of a location of the first proximity detector.

The method includes receiving, by the plurality of sensing beacons, a third signal from a third proximity detector disposed at a machine that moves within a cell of the assembly environment. Also, the method includes determining a distance between the first proximity detector and the third proximity detector based on the first signal and the third signal. The threshold is referred as a third threshold. The method includes providing a third warning, using the first proximity detector, to the first technician in response to determining that the distance between the first proximity detector and the third proximity detector is less than the third threshold. The method includes commanding the machine to halt movement in response to determining that the distance between the first proximity detector and the third proximity detector is less than a fourth threshold. The fourth threshold is less than the third threshold. The machine is referred to as a first machine of a plurality of machines, and the plurality of machines includes at least one of a robot, a gantry, or an automated equipment.

In the method, providing the third warning using the first proximity detector includes indicating a direction of a location of the third proximity detector. The warning includes a vibration, a visual indication, and/or a sound. The method includes attaching the first proximity detector to a wearable article. Moreover, the method includes providing a warning to at least one of the first technician or the second technician in response to determining that the distance between the first proximity detector and the second proximity detector is less than a threshold. Further, the method includes monitoring a distance between the first technician and the second technician based on the first signal and the second signal to alert at least one of the first technician or the second technician in response to determining that the distance between the first technician and the second technician is less than a threshold. In addition, the method includes transmitting the first signal from the first proximity detector to the plurality of beacons through at least one reflector. At least one reflector is mounted to an infrastructure body in the assembly environment. The method includes storing, by the proximity server, a path of the first technician and a path of the second technician to trace movements in the assembly environment. The first proximity detector and the second proximity detector are part of a plurality of proximity detectors, and the plurality of proximity detectors includes more than two proximity detectors.

The method includes providing a second warning, using the first proximity detector, to the first technician in response to determining that the distance between the first proximity detector and the second proximity detector is less than a second threshold. The second threshold is less than the first threshold, and the first warning is different from the second warning. At least a portion of an aircraft is assembled according to the method described above.

The present disclosure also describes a system for proximity reporting in an assembly environment. In an aspect of the present disclosure, the system includes a first proximity detector. The first proximity detector is configured to be worn by a first technician. The system further includes a second proximity detector. The second proximity detector is configured to be worn by a second technician. Each of the first proximity detector and the second proximity detector is wearable. The system further includes a proximity server in communication with the first proximity detector and the second proximity detector. The proximity detector is programmed to monitor a distance between the first proximity detector and the second proximity detector. Further, the proximity server is programmed to determine whether the distance between the first proximity detector and the second proximity detector is less than a threshold. In addition, the proximity server is programmed to command the first proximity detector to provide a warning to the first technician in response to determining that the distance between the first proximity detector and the second proximity detector is less than the threshold.

The system includes a plurality of sensing beacons in communication with the first proximity detector, the second proximity detector, and the proximity server. The first proximity detector includes a first transceiver configured to transmit a first signal to the plurality of sensing beacons. The second proximity detector includes a second transceiver configured to transmit a second signal to the plurality of sensing beacons. The proximity server is programmed to determine whether the distance between the first proximity detector and the second proximity detector is less than the threshold based on the first signal and the second signal. The warning is referred to as a first warning, and the proximity server is programmed to command the second proximity detector to provide a second warning to the second technician in response to determining that the distance between the first proximity detector and the second proximity detector is less than the threshold.

The first warning includes an indication about a direction of a location of the second proximity detector. The second warning includes an indication about a direction of a location of the first proximity detector. The first proximity detector and the second proximity detector are configured to provide the first warning and the second warning at the same time.

The system includes a third proximity detector in communication with the first proximity detector, the second proximity detector, and the proximity server. The third proximity detector is disposed at a machine that moves within a cell of the assembly environment. The machine is referred to as a first machine of a plurality of machines, and the plurality of machines includes at least one of a robot, a gantry, or an automated equipment.

The first proximity detector includes a first transceiver configured to transmit a first signal to the plurality of sensing beacons. The second proximity detector includes a second transceiver configured to transmit a second signal to the plurality of sensing beacons. The third proximity detector includes a third transceiver configured to transmit a third signal to the plurality of sensing beacons. The proximity server is programmed to determine a distance between the first proximity detector and the third proximity detector based on the first signal and the third signal. The threshold is referred to as a first threshold, and the proximity server is programmed to command the first proximity detector to provide a third warning to the first technician in response to determining that the distance between the first proximity detector and the third proximity detector is less than the third threshold. The first proximity detector is configured to provide an indication about a direction of a location of the third proximity detector.

The proximity server is programmed to determine a distance between the second proximity detector and the third proximity detector based on the second signal and the third signal. The proximity server is programmed to command the first proximity detector to provide a third warning to the first technician in response to determining that the distance between the first proximity detector and the third proximity detector is less than the third threshold. The proximity server is programmed to command the machine to halt movement in response to determining that the distance between the first proximity detector and the third proximity detector is less than a fourth threshold, and the fourth threshold is less than the third threshold. The warning includes a vibration, a visual indication, and/or a sound. The first proximity detector is attached to a wearable article.

The system includes a plurality of reflectors disposed in the assembly environment. The first proximity detector is configured to transmit a first signal to the plurality of beacons through the plurality of reflectors. At least one of the plurality of reflectors is mounted to an infrastructure body. The proximity server is configured to store a path of the first technician and a path of the second technician to trace movements in the assembly environment. The first proximity detector and the second proximity detector are part of a plurality of proximity detectors, and the plurality of proximity detectors includes more than two proximity detectors.

The first proximity detector is configured to provide a second warning to the first technician in response to determining that the distance between the first proximity detector and the second proximity detector is less than a second threshold. The second threshold is less than the first threshold, and the first warning is different from the second warning. At least a portion of an aircraft is fabricated using the system described above.

The present disclosure also describes a wearable article. In an aspect of the present disclosure, the wearable article includes an article body and a first proximity detector attached to the article body. The first proximity detector is configured to generate a first signal indicative of a location of the first proximity detector. The first proximity detector includes a transceiver configured to transmit the first signal to a plurality of sensing beacons and receive data indicative of a distance between the first proximity detector and a second proximity detector. The transceiver is configured to receive data indicative that the distance between the first proximity detector and the second proximity detector is less than a threshold. The wearable article includes an alarm coupled to the transceiver. The alarm is configured to provide a warning in response to receiving the data indicative that the distance between the first proximity detector and the second proximity detector is less than the threshold.

The first proximity detector is configured to indicate a direction of a location of the second proximity detector. Further, the first proximity detector is configured to receive the data indicative that the distance between the first proximity detector and the second proximity detector is less than the threshold from a proximity server. The proximity server is programmed to determine whether the distance between the first proximity detector and the second proximity detector is less than the threshold based on the first signal and a second signal generated by the second proximity detector. The first proximity detector is in communication with a third proximity detector disposed at a machine that moves within a cell of an assembly environment. The threshold is referred to as a first threshold, and the first proximity detector is configured to receive data indicative that a distance between the first proximity detector and the third proximity detector is less than a third threshold.

The alarm of the first proximity detector is configured to provide a third warning in response to determining that the distance between the first proximity detector and the third proximity detector is less than the third threshold. The warning includes a vibration, a visual indication, and/or a sound. The transceiver of the first proximity detector is configured to transmit the first signal to the plurality of beacons through a plurality of reflectors. The threshold is referred to as a first threshold, and the warning is referred to as a first warning. The alarm of the first proximity detector is configured to provide a second warning in response to determining that the distance between the first proximity detector and the second proximity detector is less than a third threshold. The third threshold is less than the first threshold, and the first warning is different from the second warning. The wearable article is used to fabricate at least a portion of an aircraft.

Other illustrative embodiments (e.g., methods and computer-readable media relating to the foregoing embodiments) is described below. The features, functions, and advantages that have been discussed can be achieved independently in various embodiments or is combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
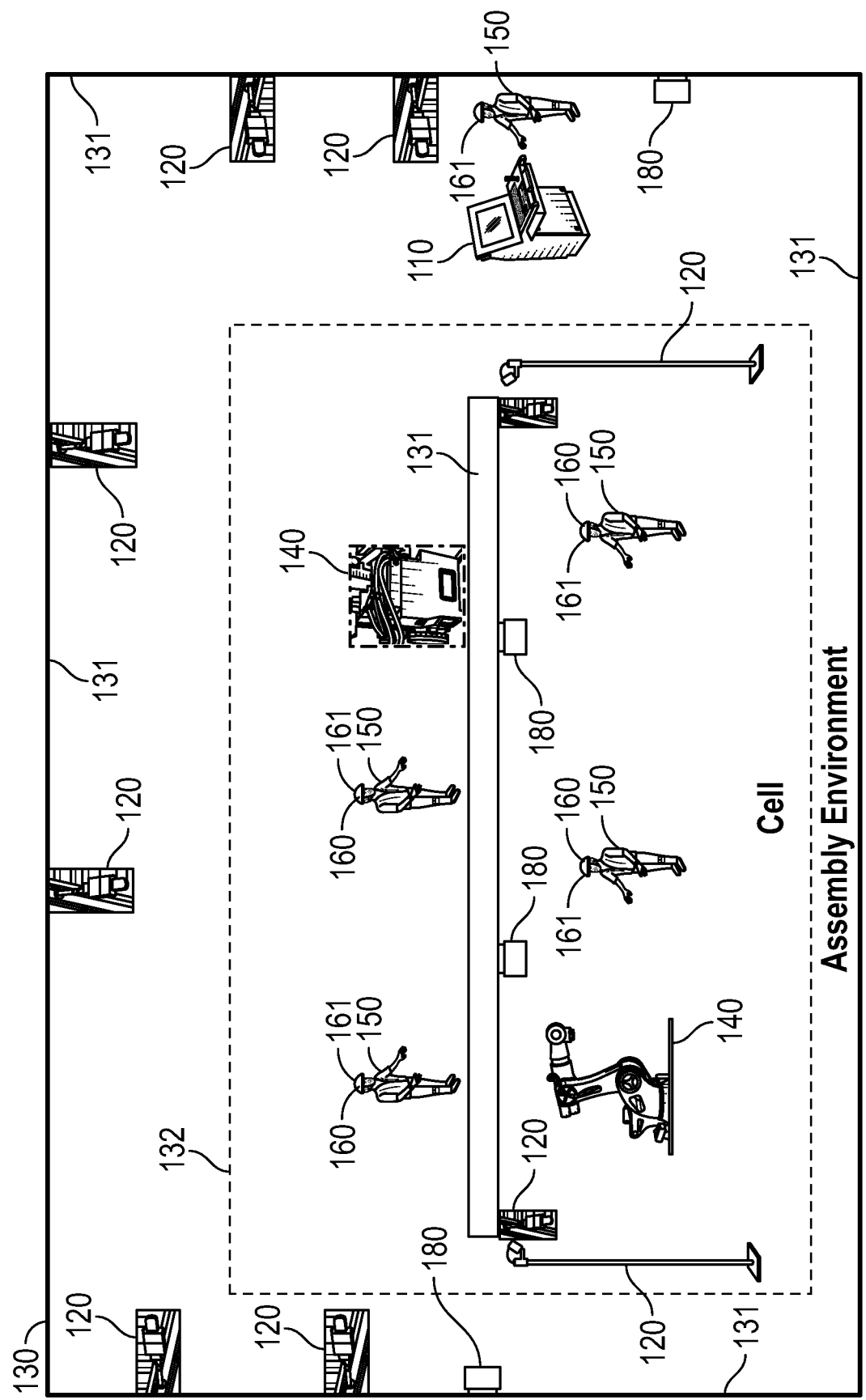
FIG. 1 is a schematic illustration of a proximity reporting system according to an aspect of the present disclosure, wherein one technician is within a predetermined distance from another technician.
Figure 2:
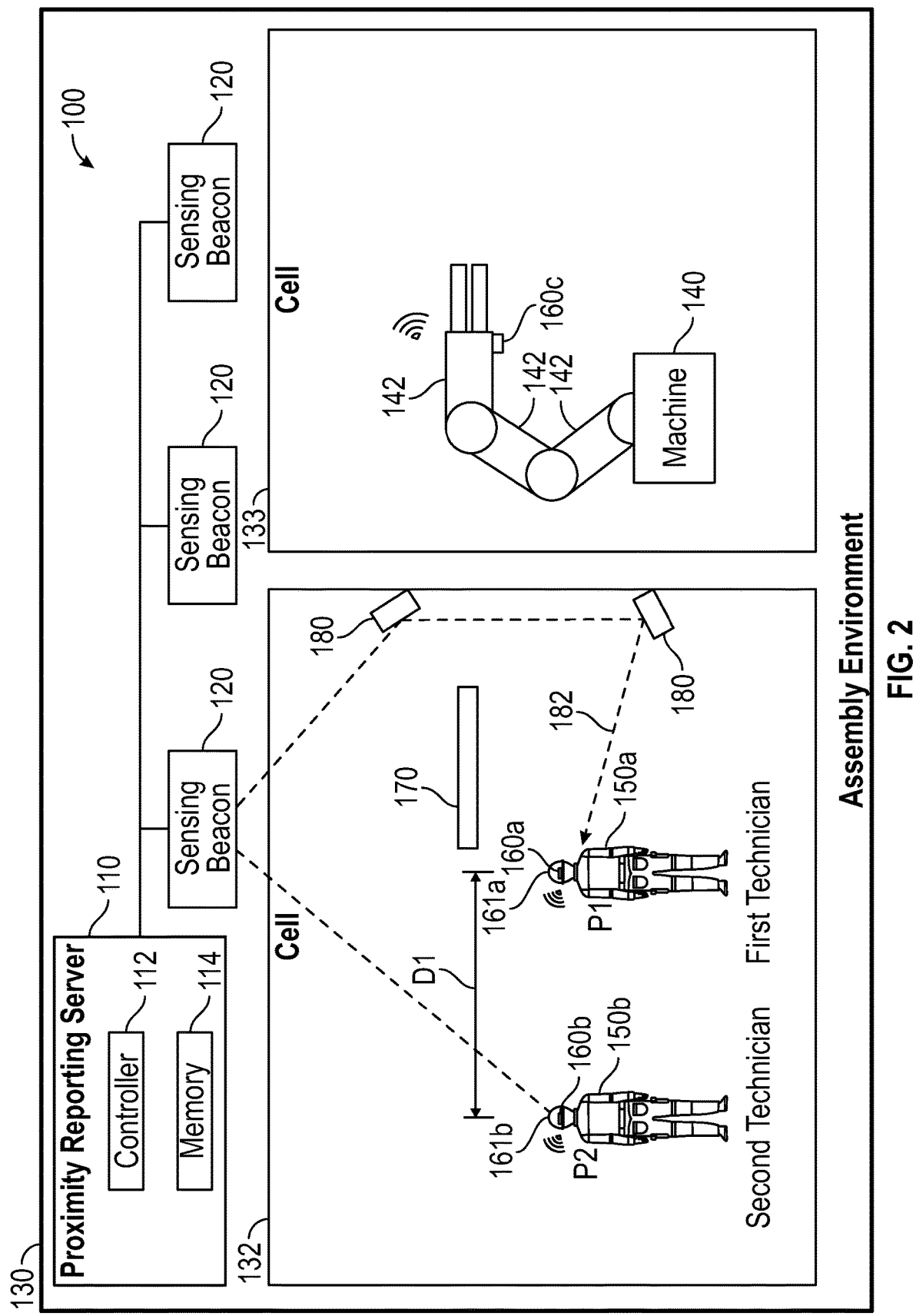
FIG. 2 is a schematic block diagram of the proximity reporting system of FIG. 1.

With reference to FIGS. 1 and 2, a proximity reporting system 100 is configured to monitor and determine distances between proximity detectors 160 within an assembly environment 130, and is also be referred to as a system for proximity reporting in the assembly environment 130. The proximity reporting system 100 is used to fabricate at least a portion of an aircraft and has been further enhanced to distinguish between technicians 150 and machines 140, and to provide warnings and/or other mitigation based on distances between technicians 150 and machines 140. This provides a technical benefit by ensuring physical distancing between technicians 150 and the safety of technicians 150 who work near machines 140, while also increasing the up-time of machines 140 within a cell. It also ensures that parts in a cell do not obscure a technician 150 from detection. As used herein, a "cell" comprises any dedicated workspace or volume in which one or more machines 140 are intended to operate.

The proximity reporting system 100 includes proximity reporting server 110 and a plurality of sensing beacons 120 (e.g., radio antennae, Ultra-Wideband (UWB) transceivers, cameras, etc.) in communication with the proximity reporting server 110. The sensing beacons 120 receive input from one or more proximity detectors 160, which are disposed inside or outside one or more of cells (e.g., first cell 132 and second cell 133) of the assembly environment 130 (e.g., a factory floor). Hence, the sensing beacons 120 operate as an interface between the proximity reporting server 110 and the proximity detectors 160. The controller 112 reviews Ultra-Wideband (UWB) input from the sensing beacons 120. The assembly environment 130 includes one or more infrastructure bodies 131, such as beams, floors, ceilings, walls, among others. The sensing beacons 120 are attached to the infrastructure bodies 131. For example, the sensing beacons 120 are movably coupled to one or more of the infrastructure bodies 131. As a non-limiting example, a pivotable mount interconnects the infrastructure body 131 and one of the sensing beacons 120 to facilitate receipt of signals from the proximity detectors 160.

The proximity detectors 160 are capable of being worn or carried by one or more technicians 150. For example, the proximity detectors 160 are carried by the technicians 150 in cell phones or other similar devices. In addition, the proximity detectors 160 are disposed at portions 142 (e.g., moving components) of machines 140. The machines 140 include robots, gantries, automated equipment's, robotic arms, Automated Guided Vehicles (AGVs), flex track machines, industrial mobile robots (IMRs) and other automated devices that move within the first cell 132. A first technician 150a is wearing a first proximity detector 160a at a first position P1, and a second technician 150b is wearing a second proximity detector 160b at a second position P2. Both the first technician 150a and the second technician 150b are disposed inside the first cell 132. As a non-limiting example, no technician is present within the second cell 133. Each of the first proximity detector 160a and the second proximity detector 160b is configured to be attached or be part of a wearable article 161. The wearable article 161 is used to fabricate at least a portion of an aircraft and is a bump cap 165 (FIG. 5), clothing, protective wear, an app for a smart phone or tablet or another article capable of being worn or carried by the technicians 150. The first proximity detector 160a is part of or may be attached to a first wearable article 161a, and the second proximity detector 160b is part of or may be attached to a second wearable article 161b. Accordingly, the first proximity detector 160a and the second proximity detector 160b are each considered a wearable. Each proximity detector 160 is configured to generate a signal indicative of the location of the proximity detector 160. For example, the first proximity detector 160a is configured to generate a first signal indicative of the location of the first proximity detector 160a (i.e., the first position P1), and the second proximity detector 160b is configured to generate a second signal indicative of the location of the second proximity detector 160b (i.e., a second position P2). In an aspect of the present disclosure, the proximity reporting system 100 includes more than two proximity detectors 160.

In addition to the proximity detectors 160, the proximity reporting system 100 includes a proximity reporting server 110 in wireless communication with proximity detectors 160 via the sensing beacons 120. The proximity reporting server 110 includes a controller 112 and a memory 114 coupled to the controller 112. The memory 114 is capable of storing data, and the controller 112 is capable of processing the data by, for instance, executing computer-readable instructions.

Based on the first signal from the first proximity detector 160a and the second signal from the second proximity detector 160b, the controller 112 of the proximity reporting server 110 determines the location of each of the first proximity detector 160a and the second proximity detector 160b. If the distance (i.e., a first distance D1) from the first proximity detector 160a worn by the first technician 150a to the second proximity detector 160b worn by the second technician 150b is less than a predefined threshold (i.e., the first threshold) stored in the memory 114, then the controller 112 provides one or more warnings to the first technician 150a and the second technician 150b using the first proximity detector 160a and the second proximity detector 160b, respectively. The controller 112 is implemented, for example, as custom circuitry, as a hardware processor executing programmed instructions, or some combination thereof.

In order to account for the presence of an obscuring object 170 (e.g., a section of fuselage, a wing panel, etc.) that blocks the line of sight to one of the proximity detectors 160 (and therefore prevent detection of the technician 150 or machine 140), reflectors 180, such as mirrors, are attached to one of the infrastructure body 131 (e.g., wall, ceiling, floor, etc.) in order to form a detection pathway 182. The reflectors 180 are capable of reflecting wavelengths of electromagnetic radiation utilized by the sensing beacons 120. Thus, in embodiments where the sensing beacons 120 include cameras, the reflectors 180 reflect optical wavelengths. In embodiments where the sensing beacons 120 detect radio wavelengths, the reflectors 180 are capable of reflecting radio wavelengths. As used herein, the term "reflector" means an object capable of reflecting and redirecting a signal without substantially attenuating the signal (e.g., by more than ten percent, by more than one percent, etc.).

Figure 3:
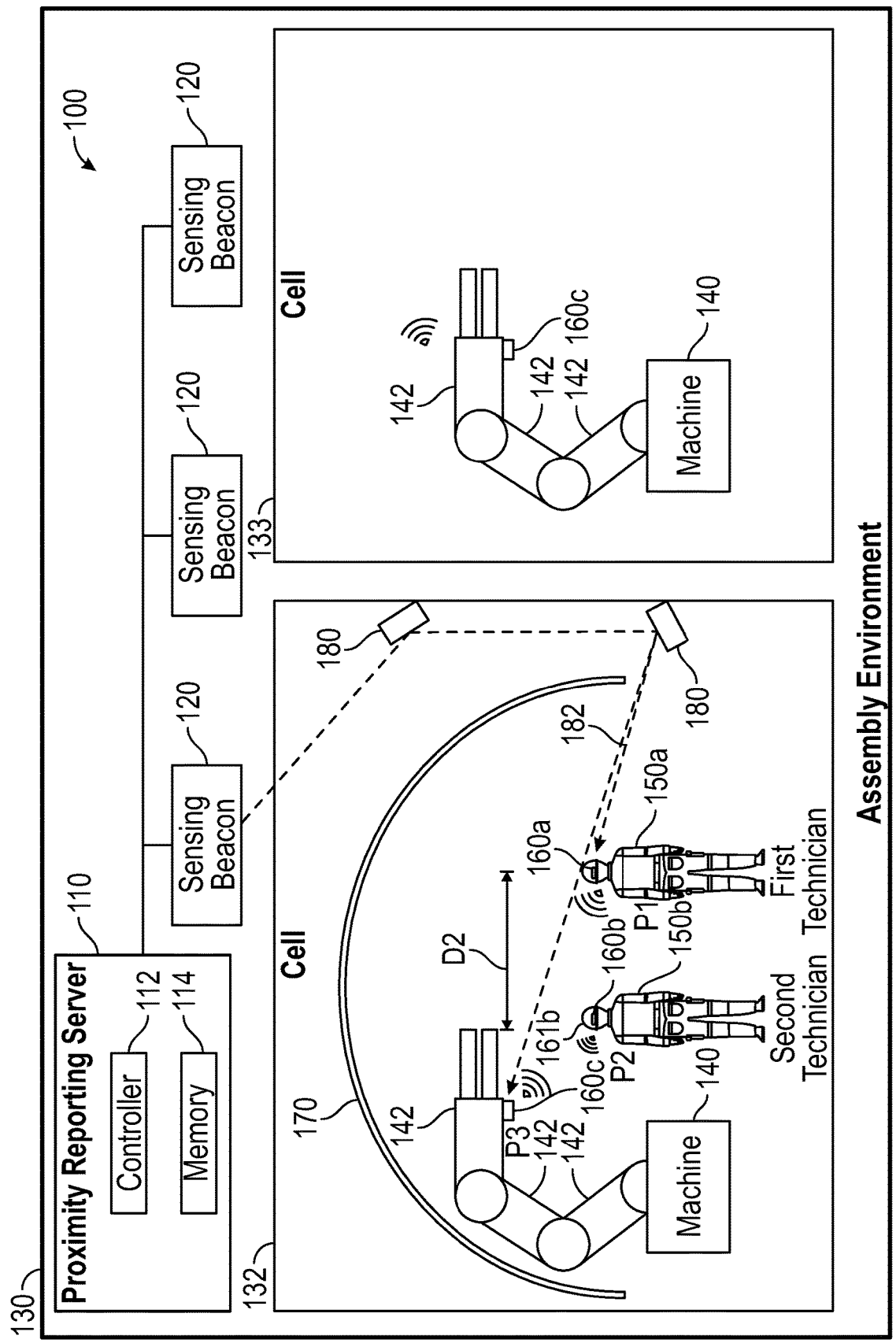
FIG. 3 is a schematic block diagram of the proximity reporting system of FIG. 1, wherein the proximity reporting system reports when a technician is within a predetermined distance from a machine.

With reference to FIG. 3, the first technician 150a (or any other technician 150) is wearing or carrying the first proximity detector 160a at the first position P1 within the first cell 132, and is at a distance (i.e., the second distance D2) to the machine 140. The second technician 150b is wearing or carrying the second proximity detector 160b at the second position P2. At least one of the machines 140 has a third proximity detector 160c at a third position P3 within the first cell 132. The third proximity detector 160c is located at a moving portion of the machine 140, a base of the machine 140, end effectors at the machine 140, etc. (i.e., a portion 142 of the machine 140). During use, the third proximity detector 160c is configured to generate a third signal indicative of the location the machine 140 (i.e., the third position P3). Furthermore, as depicted, there is presently no technician or proximity detector within second cell 133.

Based on the first signal from first proximity detector 160a and the third signal from the third proximity detector 160c, the controller 112 of the proximity reporting server 110 determines and monitors the location of each of the first proximity detector 160a and the third proximity detector 160c. If the distance (i.e., the second distance D2) from the first proximity detector 160a to the third proximity detector 160c is less than a predefined threshold (i.e., a third threshold) stored in memory 114, then the controller 112 provides a warning to the first technician 150a using the first proximity detector 160a. If the distance (i.e., the second distance D2) from the first proximity detector 160a to the third proximity detector 160c is less than a fourth threshold, which is less than the third threshold and is stored in the memory 114, then the controller 112 commands the machine 140 to halt movement.

Based on the second signal from the second proximity detector 160b and the third signal from the third proximity detector 160c, the controller 112 of the proximity reporting server 110 determines the location of each of the second proximity detector 160b and the third proximity detector 160c. If the distance from the second proximity detector 160b to the third proximity detector 160c is less than a predefined threshold (i.e., a third threshold) stored in memory 114, then the controller 112 provides a warning to the second technician 150b using the second proximity detector 160b. If the distance from the second proximity detector 160b to the third proximity detector 160c is less than a fourth threshold, which is less than the third threshold and is stored in the memory 114, then the controller 112 commands the machine 140 to halt movement.

Based on the first signal from the first proximity detector 160a and the second signal from the second proximity detector 160*b*, the controller 112 of the proximity reporting server 110 determines the location of each of the first proximity detector 160*a* and the second proximity detector 160*b*. If the distance (i.e., a first distance D1) from the first proximity detector 160*a* worn or carried by the first technician 150*a* to the second proximity detector 160*b* worn or carried by the second technician 150*b* is less than a predefined threshold (i.e., the first threshold) stored in the memory 114, then the controller 112 provides one or more warnings to the first technician 150*a* and the second technician 150*b* using the first proximity detector 160*a* and the second proximity detector 160*b*, respectively.

The proximity reporting server 110 is configured to adjust a sensing heuristic in response to the presence of an obscuring object 170 in the first cell 132. In this manner, the sensing beacons 120 can detect a technician 150 with signaling passed via the reflectors 180 along the detection pathway 182. The presence of an obstructing object 170 is automatically detected by the sensing beacons 120, or is indicated by input provided to the controller 112 from an external source.

For sensing beacons 120 that are omnidirectional, the change in sensing heuristic includes adjusting a timing window in which input is acquired (i.e., to account for an increased input delay owing to increased path length caused by the mirrors). That is, an increase in path length results in a corresponding delay, and a sampling window for detecting input via the sensing beacons 120 is moved in time by an amount equal to the delay. This change to sampling window timing varies between sensing beacons 120, but is known based on the positions and orientations of the reflectors 180 with which each sensing beacon 120 interacts. Sensing beacons 120 are directional and are capable of adjustment to point in new directions. The change in sensing heuristic includes pointing the sensing beacons 120 at the reflector 180 in order to receive signals from the detection pathway 182. As a non-limiting example, a limited number of sensing beacons 120 adjust their sensing heuristic. The number of sensing beacons 120 (e.g., three) is chosen to ensure that the technician 150 remains detectable at once from any location behind the obscuring object 170. As a result, the position P1 of the first proximity detector 160*a*, the position P2 of the second proximity detector 160*b*, and the position P3 of the third proximity detector 160*c* can be triangulated (after transforming received signal timings to account for the difference in path caused by the reflectors 180). This enables the technician 150 to remain detected while moving within the first cell 132.

Stated succinctly, the machines 140 and technicians 150 are configured to provide their locations to the proximity reporting server 110, and these locations are compared to each other. Based on this comparison, different levels of warning/remediation are provided (e.g., to warn humans and/or shutdown machines) in order to ensure physical distancing and safety between humans and between humans and machines working together in the same cell/zone. The use of reflectors 180 ensures that the proximity reporting techniques and systems discussed herein remain effective regardless of whether an obscuring object 170 is present or not.

Figure 4:
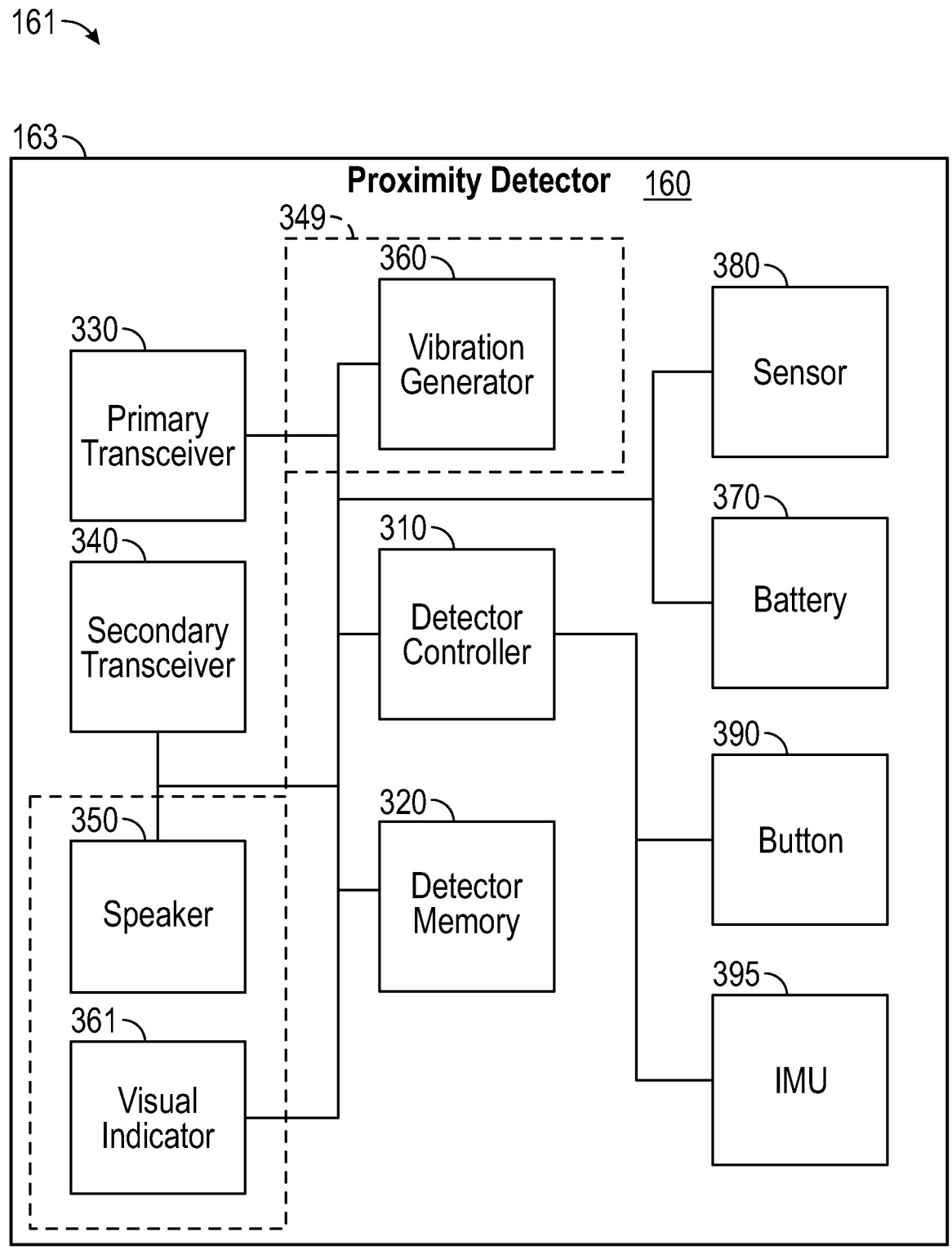
FIG. 4 is a schematic block diagram of a proximity detector of the proximity reporting system of FIG. 1.

FIG. 4 is a block diagram of an example of the proximity detector 160. The proximity detector 160 includes a detector controller 310, a detector memory 320, and a primary transceiver 330. As a non-limiting example, the primary transceiver 330 of the first proximity detector 160*a* is referred to as the first transceiver (which is configured to transmit a first signal), the primary transceiver 330 of the second proximity detector 160*b* is referred to as the second transceiver (which is configured to transmit a second signal); and the primary transceiver 330 of the third proximity detector 160*c* is referred to as the third transceiver (which is configured to the transmit a third signal). In addition to the primary transceiver 330, the proximity detector 160 includes a secondary transceiver 340. The primary transceiver 330 and the secondary transceiver 340 operate using different frequency ranges (or modalities of communication, such as optical vs. radio) in order to transmit a signal from proximity detector 160. Thus, if one frequency range experiences interference or noise, the other transceiver still provides the signal at another frequency range. The proximity detector 160 also includes vibration generator 360 (e.g., a piezoelectric element, a vibrational motor, etc.), speakers 350 and/or visual indicators 361 (e.g., a light, a visual user interface, etc.). The vibration generator 360, the speaker 350, and/or the visual indicator 361 together or individually is referred to as an alarm 349. The vibration generator 360 is configured to generate a vibration. The speaker 350 is configured to emit a sound. The visual indicator 361 is configured to generate a visual indication, such as a light. The alarm 349 is coupled to the primary transceiver 330 and the secondary transceiver 340. The proximity detector 160 is part of or attached to an article body 163 of the wearable article 161 (e.g., bump cap, helmet, eyewear, clothing, face shield, headphones, etc.). Accordingly, one or more wearable articles 161 include one or more of the elements (e.g., vibration generator, etc.) of the proximity detector 160. Specifically, for the first proximity detector 160*a* and the second proximity detector 160*b* that are worn by the first technician 150*a* and the second technician 150*b*, respectively, the proximity detectors 160 are wearables that are part of (or attached to) the article body 163 of the wearable article 161. However, for the third proximity detector 160*c* that is disposed at the machine 140, this proximity detector 160 is not wearable and is not attached to (or is part of) the wearable article 161. Rather, the third proximity detector 160*c* is disposed on or within the portion 142 of the machine 140.

When generating a warning, the detector controller 310 activates one or all of these elements (i.e., vibration generator 360, one or more speakers 350, and/or visual indicator 361) to draw the attention of the technician 150. The visual indicator 361 generates an alert at eyewear or face shield worn by the technician 150 to cause flashing lights, other visual input, or vibrations that provide a warning. For example, an audio warning is generated by portions of eyewear located proximate to the temples of the technician 150 and, in particular the ends, of the temples. The speakers 350 are headphones or earphones. The eyewear may, for example, include smart safety glasses with visual, audio, vibratory warnings or any combination thereof. As a non-limiting example, the face shield is configured as a smart face shield 362 (FIG. 5) with visual, audio, warnings, vibratory warnings, or any combination thereof. The warning, for example, of the first proximity detector 160*a* includes an indication of the direction of the location of the second proximity detector 160*b* or another proximity detector 160. Similarly, the second proximity detector 160*b* includes an indication of the location of the first proximity detector 160*a* or another proximity detector 160. To provide location indicators, one or more speakers 350, such as headphones, voice an utterance indicating the location of another proximity detector 160. Alternatively (or additionally), the visual indicator 361 activates lights at specific locations of the eyewear or face shield to indicate the direction of another proximity detector 160. These lights are shaped as arrows to indicate the direction of another one of the proximity detectors 160. The warning of the first proximity detector 160*a* is referred to as the first warning. The warning of the second proximity detector 160*b* is referred to as the second warning, and the warning of the third proximity detector 160*c* is referred to as the third warning. To distinguish between warnings, the warning of proximity to the machine 140 has a pitch or frequency of flashing that is different than the pitch or frequency of the warning of proximity to another technician 150. The warning also indicates the direction of the proximity detector 160 that is nearest the technician 150.

The proximity detector 160 is part of or attached to an article body 163 of the wearable article 161 (e.g., bump cap, helmet, eyewear, clothing, face shield, headphones, etc.) Accordingly, one or more wearable articles 161 include one or more of the elements (e.g., vibration generator, etc.) of the proximity detector 160. Bluetooth technology is utilized, wherein the technician 150 wears a base station in communication with wearable article 161 such as hats, helmets, gloves, glasses, vests, etc. that implement proximity detectors 160. As a non-limiting example, the helmets is configured to provide warnings indicative of machine proximity, whereas the glasses is configured to provide warnings indicative of technician proximity.

The proximity detector 160 includes (or be coupled to) an inertial measurement unit 395 which is capable of detecting acceleration indicative of motions of the proximity detector 160. By integrating these accelerations over a period of time (e.g., once per second, every fraction of a second, at multiple kilohertz, etc.), the movement of the technician 150 or machines 140 can be ascertained. This information is utilized to validate or complement location data determined via sensing beacons 120. For example, the inertial measurement unit 395 has a sampling rate that is substantially higher than that of the sensing beacons 120. Thus, inertial measurement unit 395 is utilized to detect rapid motions of the technicians 150 or machines 140 in between UWB pulses received/transmitted by the sensing beacons 120. This helps to accurately detect the position of multiple technicians 150 and multiple machines 140, even when the technicians 150 or machines 140 move quickly in between pulses of detection for sensing beacons 120.

The inertial measurement unit 395 provides positional updates of the technicians 150 (e.g., the first technician 150*a* and/or the second technician 150*b*) to the controller 112 of the proximity reporting server 110. The inertial measurement unit 395 receives information indicating the location of the proximity detectors 160. The detector controller 310 then internally updates its position based on input from the inertial measurement unit 395 during lulls in which sensing beacons 120 are not operated (e.g., for a fraction of a second). Thus, the proximity reporting server 110 stores the path of the technicians 150 (e.g., the first technician 150*a* and/or the second technician 150*b*) and the machines 140 in the memory 114 to trace the movements of the technicians 150 and the machines 140 in the assembly environment 130. If input from the inertial measurement unit 395 indicates that the proximity detector 160 has moved closer than a threshold distance during a lull, the detector controller 310 generates a warning as discussed above in order to warn a technician 150 wearing the proximity detector 160.

The proximity detector 160 also includes a battery 370 and a sensor 380. The sensor 380 detects a battery level (e.g., by measuring voltage at battery 370). The sensor 380 reports this battery level to the detector controller 310. If the battery level is below a predetermined value, then the detector controller 310 generates a battery level warning via the speaker 350, the visual indicator 361, and/or the vibration generator 360. The proximity detector 160 further includes a button 390. Pressing the button 390 operates the first proximity detector 160*a* to issue a command to remotely halt machines 140 that are within the same cell (e.g., first cell 132) as the technician 150.

The battery level information is reported to proximity reporting server 110. Each of the first cell 132 and the second cell 133 is associated with a predetermined battery level. This is the battery level desired in order to ensure that the proximity detector 160 continues to operate while the technician 150 performs inspections or maintenance within that cell (e.g., first cell 132). Upon entry to the first cell 132 or the second cell 133 as determined based on a triangulated location of the proximity detector 160, the controller 112 of the proximity reporting server 110 compares the current battery level to that desired for the first cell 132 or the second cell 133. The controller 112 directs the proximity detector 160 to generate a warning if the battery level is below the predetermined battery level when the technician 150 attempts to enter the first cell 132 or the second cell 133. The proximity reporting server 110 estimates a period of time during which the technician 150 is expected to remain in the first cell 132 or the second cell 133 that they currently occupy, and instruct proximity detector 160 to generate a battery level warning if the battery level drops below a battery level expected at this point in time during the inspection or maintenance process.

The proximity reporting server 110 determines that at least one of the proximity detectors 160 has not transmitted a signal for longer than a predefined duration (e.g., one second, ten seconds, thirty seconds, one minute, etc.). In response to this determination, the proximity reporting server 110 transmits a halt instruction to all machines located in the first cell 132 or the second cell 133 that the proximity detector 160 was last detected in. This ensures safety in the event of an unexpected power loss to a proximity detector, and enables the technician 150 to safely exit the cell even in the event of total battery loss or device failure.

The proximity detectors 160, such as those worn by technicians 150 or disposed at one of the machines 140, are equipped without all the elements described above (e.g., speakers 350). The proximity detectors 160 are directly attached to a power source of the machine 140 that they are attached to, and have controllers which directly communicate with a controller of the machine 140 to which they are mounted.

Figure 5:
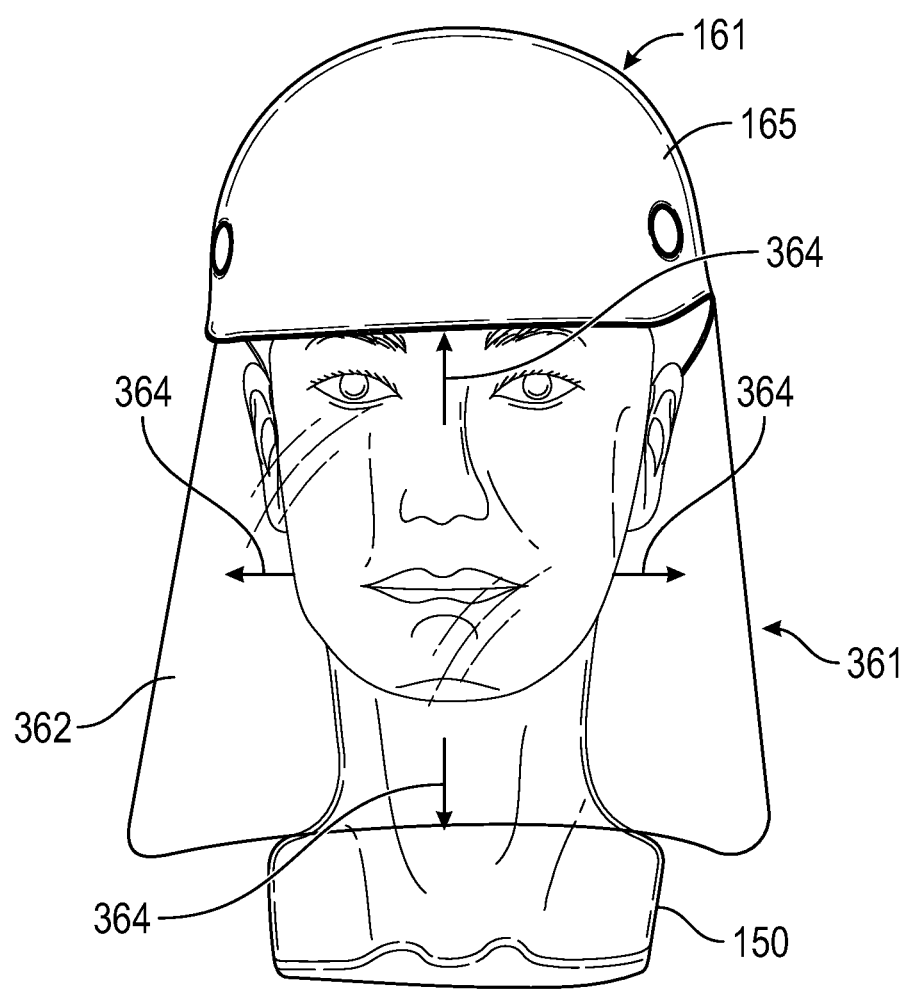
FIG. 5 is a front view of a technician wearing a bump cap coupled to a smart face shield.

With reference to FIG. 5, in an aspect of the present disclosure, the wearable article 161 is a bump cap 165 worn by the technician 150. The visual indicator 361 is configured as a smart face shield 362 that covers the face of the technician 150. In an aspect of the present disclosure, the visual indicator 361 is configured as a smart eyewear that covers the eyes of the technician 150. The smart face shield 362 is coupled to the bump cap 165 and activates lights 364 at specific locations to indicate the direction of another proximity detector 160. These lights 364 are shaped as arrows to indicate the direction of another one of the proximity detectors 160. For example, one or more lights 364 are activated to indicate the direction of the nearest of the proximity detectors 160. Alternatively (or additionally), the direction of an adjacent one of the proximity detectors 160 is indicated through verbal warnings via the speakers 350. These verbal warnings take the form of a verbal warning stating "halt movement forward," "do not move to the left," "do not move south," or similar phrases.

Figure 6A:
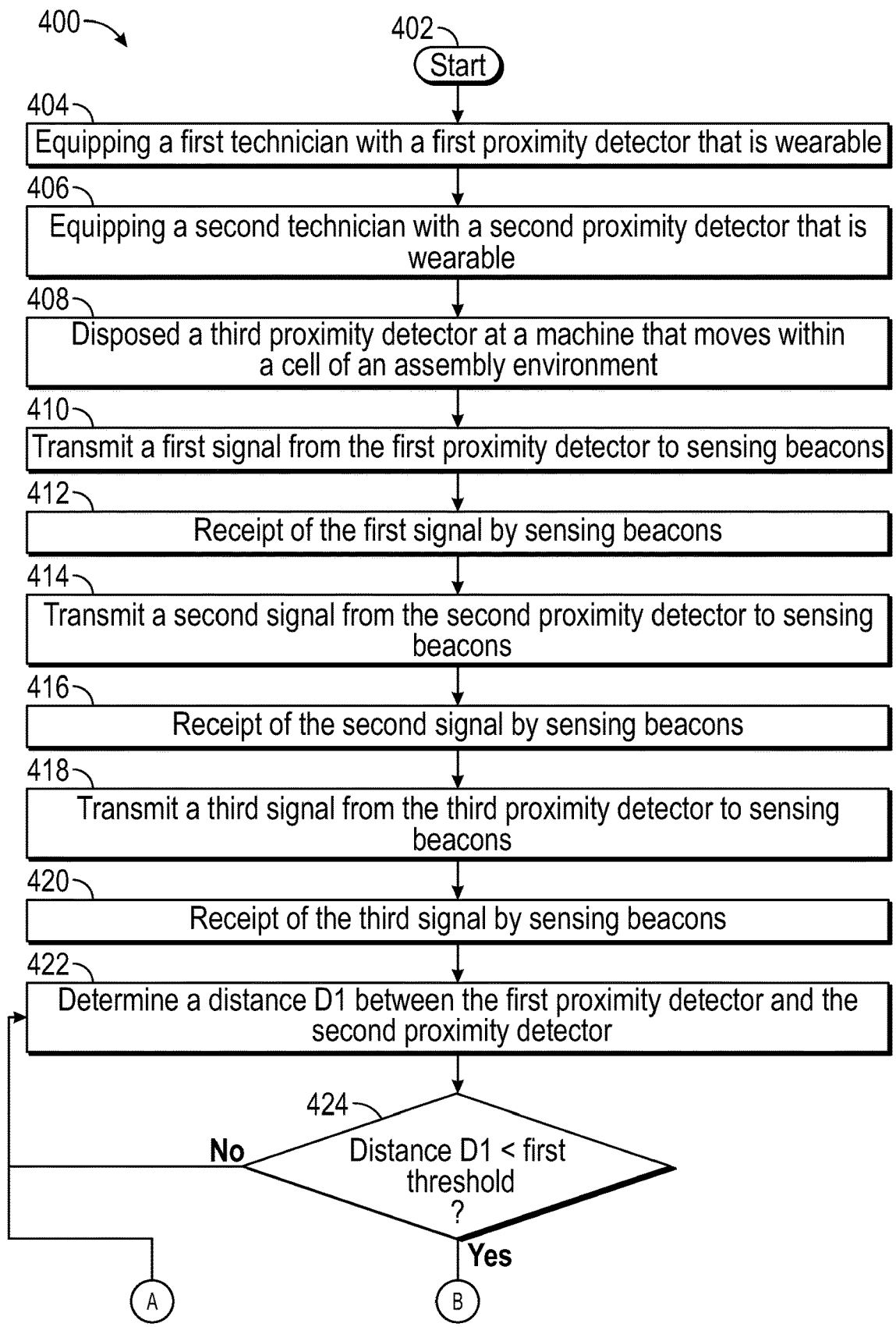
FIG. 6A is a first part of a flowchart of a method for reporting proximity between technicians in the assembly environment.
Figure 6B:
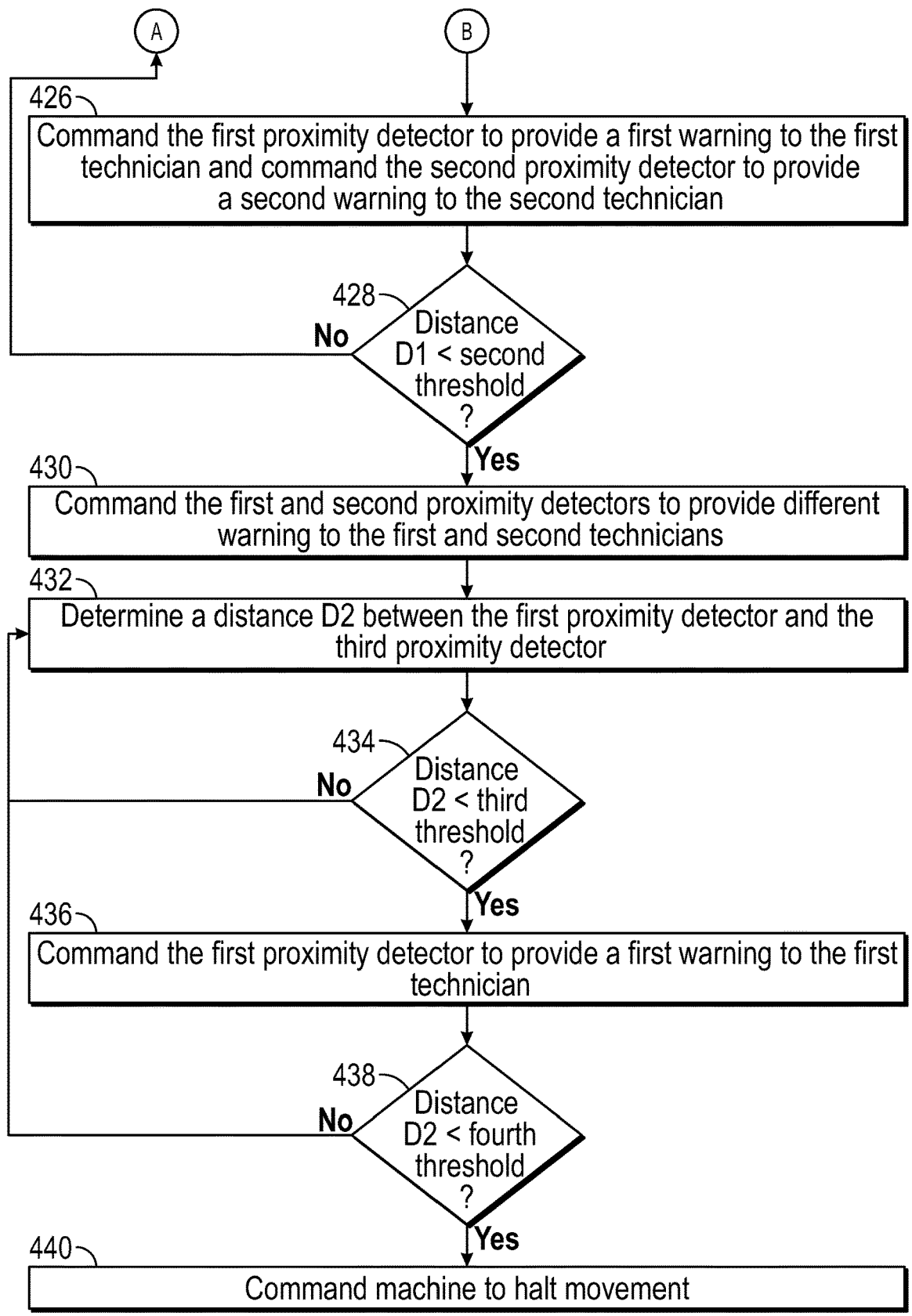
FIG. 6B is a second part of the flowchart of the method for reporting proximity between technicians in the assembly environment.

FIGS. 6A and 6B together depict a flowchart illustrating a method 400 for reporting proximity between technicians 150 and machines 140. During this method 400, the machines 140 are operating to assemble or join composite parts and/or metal parts for use in an aircraft. The steps of the method 400 are described with reference to proximity reporting system 100 of FIG. 1, but the method 400 is performed in other systems. For instance, the proximity reporting server 110 is programmed to execute the method 400. The steps of the flowcharts described herein are not all inclusive, and, in an aspect of the present disclosure, the method 400 includes other steps not shown. In another aspect of the present disclosure, the steps described herein are performed in an alternative order.

The method 400 starts at block 402. Then, the method 400 proceeds to block 404. At block 404, the first technician 150a is equipped with the first proximity detector 160a. The first proximity detector 160a is wearable in that it is carried on the first technician 150a in a hands-free manner. Thus, the first proximity detector 160a is attached to the article body 163 of the wearable article 161 worn by the first technician 150a. For example, the first proximity detector 160a is attached to headwear (e.g., a helmet) of the technician 150, is equipped by hook-and-loop fastener to the fabric of clothing worn by the first technician 150a, is placed in a pocket of the first technician 150a, is in the form of a pendant or smart wrist watch worn by the first technician 150a, is sewn or bonded to clothing worn by the first technician 150a, is implemented as smart safety glasses or face shield that provide visual, audio or vibratory warnings or any combination thereof, or is equipped via other means. The first proximity detector 160a includes or may be a cellular phone or tablet, and utilizes technology such as Global Positioning System (GPS) technology. The method 400 then continues to block 406.

At block 406, the second technician 150b is equipped with the second proximity detector 160b. As discussed above, the second proximity detector 160b is wearable in that it is carried on the second technician 150b in a hands-free manner. Thus, the second proximity detector 160b is attached to the article body 163 of the wearable article 161 worn by the second technician 150b. For example, the second proximity detector 160b is attached to headwear (e.g., a helmet) of the second technician 150b, is equipped by hook-and-loop fastener to the fabric of clothing worn by the second technician 150b, is placed in a pocket of the technician, is in the form of a pendant or smart wrist watch worn by the second technician 150b, is sewn or bonded to clothing worn by the second technician 150b, is implemented as smart safety glasses or face shield that provide visual, audio or vibratory warnings or any combination thereof, or is equipped via other means. The second proximity detector 160b includes or be a cellular phone or tablet, and utilizes technology such as Global Positioning System (GPS) technology. The method 400 then continues to block 408.

At block 408, the third proximity detector 160c is disposed at a portion 142 of a machine 140 that moves within assembly environment 130. This comprises affixing multiple third proximity detectors 160c at (e.g., disposed on or within) each machine 140 within the cell (e.g., first cell 132), and is performed during initial setup and calibration of the machines 140 before maintenance or inspection is desired. The third proximity detector 160c is coupled to the power supply of the machine 140, and communicates with a controller of the machine 140. With the first proximity detector 160a, the second proximity detector 160b, and the third proximity detector 160c in place, the first technician 150a and the second technician 150b move freely within the assembly environment 130 and proceed into the first cell 132 to, for example, perform inspections, assist with assembly or maintenance. During this time, machines 140 within the first cell 132 continue to operate. However, the machines 140 are not required to be in continuous motion during placement or use of the first proximity detector 160a and the second proximity detector 160b. Rather, the third proximity detector 160c is capable of detecting a position of the machine 140 both during operation of the machine 140 and during pauses in operation of the machine 140. The method 400 then continues to block 410.

At block 410, the first proximity detector 160a transmits a first signal to one or more sensing beacons 120 in the assembly environment 130 (e.g., sensing beacons 120 disposed outside of the first cell 132, inside of the first cell 132, etc.). The first signal includes an Ultra-Wideband (UWB) radio signal that provides a unique identifier for the first proximity detector 160a that distinguishes it from other proximity detectors 160 in the assembly environment 130. The first proximity detector 160a is associated with a specific technician (i.e., the first technician 150a) indicated in the memory 114 of proximity reporting server 110. Alternatively (or additionally), the first signal explicitly recites the technician (i.e., the first technician 150a) to which the first proximity detector 160a is attached. The first signal is transmitted over multiple different radio bands or channels of communication. Alternatively (or additionally) the first signal is transmitted via a Light Emitting Diode (LED) as a visual code in certain embodiments. Transmitting the first signal via multiple distinct channels of communication provides a technical benefit of ensuring that the first signal can be received and processed by sensing beacons 120. The first signal is transmitted continuously or periodically (e.g., once or multiple times per second). The method 400 then proceeds to block 412.

At block 412, one or more of the sensing beacons 120 receives the first signal from the first proximity detector 160a. The first signal is received at the sensing beacons 120 directly from the first proximity detector 160a (i.e., without reflecting from the reflectors 180) or through the reflectors 180. The controller 112 of the proximity reporting server 110 determines whether an obscuring object 170 (e.g., a part being worked upon in the assembly environment 130, such as a section of fuselage or a wing) is present. As a non-limiting example, the controller 112 infers the presence of the obscuring object 170 based on input provided directly by the first technician 150a or based on input from the sensing beacons 120. For example, when the first cell 132 is utilized to perform work on a limited selection of parts that each have an expected orientation, the sensing beacons 120 detect the presence of an obscuring object 170 directly based on input from the sensing beacons 120, such as based on sensor readings indicative of the obscuring object 170 being located within the first cell 132. For example, one or more sensing beacons 120 utilize a laser or acoustic sensor to measure a distance beneath it. If the distances measured by multiple sensors are less than a known distance to the floor, then the controller 112 determines that the obscuring object 170 is present. Alternatively, or additionally, the sensing beacons 120 are in the form of a camera for the purpose of detecting the presence of the obscuring object. 170.

The sensing beacons 120 operate to indirectly detect the location P1 of the first proximity detector 160a via the reflectors 180 when the obscuring object 170 is present. This comprises pointing the sensing beacons 120 towards one or more of the reflectors 180 when the sensing beacons 120 are directional. The sensing beacons 120 interacts with the reflectors 180 such that at least three distinct pathways are provided to each location in order to enable triangulation. Indirect detection entails altering a sensing heuristic for the sensing beacons 120 when the sensing beacons 120 are omnidirectional. For each sensing beacon 120, there is an expected maximum distance of detection and minimum distance of detection, which corresponds with a sampling window in which input from the sensing beacon 120 is reviewed. Signaling traversing the detection pathway 182 alters (e.g., increases) the minimum and maximum distances of detection, which in turn alters (e.g., increases) the timing at which incoming signaling is expected. Thus, a sampling window in which signals are acquired for analysis is adjusted by an amount equal to the change in expected signaling timing. Based on received signaling, the location of the first proximity detector 160*a* is determined (e.g., via triangulation). The method 400 then continues to block 414.

At block 414, the second proximity detector 160*b* transmits a second signal to one or more sensing beacons 120 in the assembly environment 130 (e.g., sensing beacons 120 disposed outside of the first cell 132, inside of the first cell 132, etc.). The second signal includes an Ultra-Wideband (UWB) radio signal that provides a unique identifier for the second proximity detector 160*b* that distinguishes it from other proximity detectors 160 in the assembly environment 130. The second proximity detector 160*b* is associated with a specific technician (i.e., the second technician 150*b*) indicated in memory 114 of proximity reporting server 110. Alternatively (or additionally), the first signal explicitly recites the technician (i.e., the second technician 150*b*) to which the second proximity detector 160*b* is attached. The second signal is transmitted over multiple different radio bands or channels of communication. Alternatively (or additionally), the second signal is transmitted via a light source, such as Light Emitting Diode (LED), as a visual code in certain embodiments. Transmitting the second signal via multiple distinct channels of communication provides a technical benefit of ensuring that the second signal can be received and processed by sensing beacons 120. The second signal is transmitted continuously or periodically (e.g., once or multiple times per second). The method 400 then proceeds to block 416.

At block 416, one or more sensing beacons 120 receive the second signal from the second proximity detector 160*b*. The second signal is received at the sensing beacons 120 directly from the second proximity detector 160*b* (i.e., without reflecting off of reflectors 180) or through one or more reflectors 180. The controller 112 of the proximity reporting server 110 determines whether an obscuring object 170 (e.g., a part being worked upon in the assembly environment 130, such as a section of fuselage or a wing) is present. As a non-limiting example, the controller 112 infers the presence of the obscuring object 170 based on input provided directly by the second technician 150*b*, or based on input from the sensing beacons 120. For example, when the first cell 132 is utilized to perform work on a limited selection of parts that each have an expected orientation, the sensing beacons 120 detect the presence of an obscuring object 170 directly based input from the sensing beacons 120, such as based on sensor readings indicative of the obscuring object 170 being located within the first cell 132. For example, one or more sensing beacons 120 utilize a laser or acoustic sensor to measure a distance beneath it. If the distances measured by multiple sensors are less than a known distance to the floor, then the controller 112 determines that the obscuring object 170 is present. Alternatively (or additionally), the sensing beacons 120 are in the form of a camera for the purpose of detecting the presence of the obscuring object 170.

The sensing beacons 120 operate to indirectly detect the location P2 of the second proximity detector 160*b* via the reflectors 180 when the obscuring object 170 is present. This comprises pointing the sensing beacons 120 towards one or more of the reflectors 180 when the sensing beacons 120 are directional. The sensing beacons 120 interact with the reflectors 180 such that at least three distinct pathways are provided to each location in order to enable triangulation. Indirect detection entails altering a sensing heuristic for the sensing beacons 120 when the sensing beacons 120 are omnidirectional. For each sensing beacon 120, there is an expected maximum distance of detection and minimum distance of detection, which corresponds with a sampling window in which input from the sensing beacon 120 is reviewed. Signaling traversing the detection pathway 182 alters (e.g., increases) the minimum and maximum distances of detection, which in turn alters (e.g., increases) the timing at which incoming signaling is expected. Thus, a sampling window in which signals are acquired for analysis is adjusted by an amount equal to the change in expected signaling timing. Based on received signaling, the location of the first proximity detector 160*a* is determined (e.g., via triangulation). The method 400 then continues to block 418.

At block 418, the third proximity detector 160*c* transmits a third signal to one or more sensing beacons 120 in the assembly environment 130 (e.g., sensing beacons 120 disposed at the machine 140, etc.). The third signal includes an Ultra-Wideband (UWB) radio signal that provides a unique identifier for the third proximity detector 160*c* that distinguishes it from other proximity detectors 160 in the assembly environment 130. The third proximity detector 160*c* is associated with a machine 140 indicated in the memory 114 of proximity reporting server 110. Alternatively (or additionally), the third signal explicitly recites the machine 140 to which the third proximity detector 160*c* is attached. The third signal is transmitted over multiple different radio bands or channels of communication. Alternatively (or additionally) the third signal is transmitted via a light source, such as Light Emitting Diode (LED), as a visual code in certain embodiments. Transmitting the third signal via multiple distinct channels of communication provides a technical benefit of ensuring that the second signal can be received and processed by sensing beacons 120. The third signal is transmitted continuously or periodically (e.g., once or multiple times per second). The method 400 then proceeds to block 420.

At block 420, one or more sensing beacons 120 receive the third signal from the third proximity detector 160*c*. The third signal is received at the sensing beacons 120 directly from the third proximity detector 160*c* (i.e., without reflecting off of reflectors 180) or through one or more reflectors 180. The controller 112 of the proximity reporting server 110 determines whether an obscuring object 170 (e.g., a part being worked upon in the assembly environment 130, such as a section of fuselage or a wing) is present. As a non-limiting example, the controller 112 infers based on input from the sensing beacons 120. For example, when the first cell 132 is utilized to perform work on a limited selection of parts that each have an expected orientation, the sensing beacons 120 detect the presence of an obscuring object 170 directly based upon input from the sensing beacons 120, such as based on sensor readings indicative of the obscuring object 170 being located within the first cell 132. For example, one or more sensing beacons 120 utilizes a laser or acoustic sensor to measure a distance beneath it. If the distances measured by multiple sensors are less than a known distance to the floor, then the controller 112 determines that the obscuring object 170 is present. Alternatively (or additionally), the sensing beacons 120 are in the form of a camera for the purpose of detecting the presence of the obscuring object. 170.

The sensing beacons 120 operate to indirectly detect the location P3 of the third proximity detector 160*c* via the reflectors 180 when the obscuring object 170 is present. This comprises pointing the sensing beacons 120 towards one or more of the reflectors 180 when the sensing beacons 120 are directional. The sensing beacons 120 interact with the reflectors 180 such that at least three distinct pathways are provided to each location in order to enable triangulation. Indirect detection entails altering a sensing heuristic for the sensing beacons 120 when the sensing beacons 120 are omnidirectional. For each sensing beacon 120, there is an expected maximum distance of detection and minimum distance of detection, which corresponds with a sampling window in which input from the sensing beacon 120 is reviewed. Signaling traversing the detection pathway 182 alters (e.g., increases) the minimum and maximum distances of detection, which in turn alters (e.g., increases) the timing at which incoming signaling is expected. Thus, a sampling window in which signals are acquired for analysis is adjusted by an amount equal to the change in expected signaling timing. Based on received signaling, the location of the first proximity detector 160*a* is determined (e.g., via triangulation). The method 400 then continues to block 422.

At block 422, the controller 112 of the proximity reporting server 110 determines and monitors the location (i.e., the first position P1, the second position P2, and the third position P3) of the first proximity detector 160*a*, the second proximity detector 160*b*, and the third proximity detector 160*c*, respectively, based on the first signal, the second signal, and the third signal. The location (i.e., the first position P1, the second position P2, and the third position P3) of the first proximity detector 160*a*, the second proximity detector 160*b*, and the third proximity detector 160*c*, respectively, are stored on the memory 114. With the locations of the proximity detectors 160 known, the controller 112 determines and monitors a distance (i.e., distance D1) between the first proximity detector 160*a* and the second proximity detector 160*b* based on the first signal and the second signal. This is performed by consulting information stored in the memory 114 indicating a position of each sensing beacon 120, triangulating the first position P1 of the first proximity detector 160*a* and the second position P2 of the second proximity detector 160*b* based on the strength of signals received at each sensing beacon 120, and determining an amount of separation between the first position P1 and the second position P2. The memory 114 stores signals from the sensing beacons 120 as a part of this process. The sensing beacons 120 include cameras, and the angle of each camera and stereoscopic equipment or techniques is used in order to determine position. The controller 112 selects which proximity detectors 160 to determine distances between. For example, the controller 112 selectively foregoes distance determinations between proximity detectors 160 located on the same entity (e.g., the same technician, the same machine, etc.) and proximity detectors 160 located on machines (e.g., in circumstances where existing collision avoidance technologies for the machines 140 already prevent collisions), etc. This enables greater allocation of resources for controller 112 to perform distance determinations which are most relevant (i.e., most likely to enhance safety and ensure physical distancing between technicians 150). Motion detection techniques are used on distance data acquired over time to determine the current speed and/or direction of a technician 150 or machine 140. The proximity reporting server 110 stores the path of the first technician 150*a* and the path of the second technician 150*b* (and any other technician 150) on its memory 114 to trace movements in the assembly environment 130. This stored information is later used to determine which technicians 150 are complying with physical distancing guidelines. The method 400 then continues to block 424.

Once the distance (i.e., the distance D1) between the first proximity detector 160*a* and the second proximity detector 160*b* has been determined at block 422, this distance is compared to a threshold (i.e., a first threshold) at block 424. The first threshold is stored on the memory 114. If the distance (i.e., the distance D1) is not less than the threshold (e.g., a distance at which a safety warning will be provided to the technician), then the method 400 returns to block 422, and the proximity reporting system 100 determines new locations of the proximity detectors 160. Alternatively, if the distance (i.e., the distance D1) is less than the first threshold, the method 400 continues to block 426.

Block 426 includes directing or commanding the first proximity detector 160*a* to provide a warning (i.e., a first warning) to the first technician 150*a* and directing or commanding the second proximity detector 160*b* to provide a warning (i.e., a second warning) to the second technician 150*b* in response to determining that the distance (i.e., the distance D1) between the first proximity detector 160*a* and the second proximity detector 160*b* is less than the first threshold. The first warning and the second warning are provided at the same time. The first threshold described is statically defined or is dynamically determined based on movements of the first technician 150*a* and the second technician 150*b*. For example, if a path and velocity of a technician 150 (e.g., the first technician 150*a* and/or the second technician 150*b*) in the future is expected to cause the first technician 150*a* to reduce its distance to the second technician 150*b*, the first threshold is increased to ensure that the first warning to the first technician 150*a* is issued more quickly.

If the distance (i.e., the distance D1) is less than the first threshold, the controller 112 directs the first proximity detector 160*a* to activate the alarm 349 (e.g., via sensing beacons 120) via detection pathway 182 to provide a warning to the first technician 150*a*. That is, the warning is provided through the detection pathway 182. Specifically, a transmission provided across the detection pathway 182 causes the first proximity detector 160*a* to alert the first technician 150*a* via any suitable alert (e.g., a visual indication, a sound, and/or a vibration, etc.). Thus, the alarm 349 is configured to provide a warning in response to receiving the data indicative that the distance between the first proximity detector 160*a* and the second proximity detector 160*b* is less than the first threshold.

The first warning includes an indication of the direction of the second proximity detector 160*b*, and the second warning includes an indication of the direction of the first proximity detector 160*a*. The first and second warnings take the form of a verbal warning stating "halt movement forward," "do not move to the left," "do not move south," or similar phrases, depending on the location of the first technician 150*a* relative to the second technician 150*b*. The speakers 350 provide the verbal warning or sound. The first and second warnings are implemented in the form of a flashing light on the helmet, glasses, face shield, or gloves of the technician, or as a flashing light or suitable visual indication. The visual indicator 361 is flashing lights at specific locations of the helmet, glasses, face shield, or gloves to indicate the direction of the location of another proximity detector 160. The first and second warnings include vibrations generated by the vibration generator 360. Regardless of its form, the first and warnings are cues for the technicians 150 that encourage physical distancing. Then, the method 400 proceeds to block 428.

At block 428, the controller 112 compares the distance (i.e., the distance D1) between the first proximity detector 160a and the second proximity detector 160b to a threshold (i.e., a second threshold). The second threshold is less than the first threshold. The second threshold is stored on the memory 114. If the distance (i.e., the distance D1) is not less than the threshold (e.g., a distance at which a safety warning will be provided to the technician 150), then the method 400 returns to block 422, and the proximity reporting system 100 determines new locations of the proximity detectors 160. Alternatively, if the distance (i.e., the distance D1) is less than the second threshold, the method 400 continues to block 430.

At block 430, the first proximity detector 160a and the second proximity detector 160b provide a different warning to the first technician 150a and the second technician 150b, respectively, in response to determining that the distance (i.e., the distance D1) between the first proximity detector 160a and the second proximity detector 160b is less than the second threshold that is less than the first threshold discussed above. While provided by both the first proximity detector 160a and the second proximity detector 160b, this warning is different from the first and second warnings described above. For example, this warning includes a vibration at a higher frequency than the vibration of the first and second warnings described above. Further, this warning includes an audible sound that is louder than the audible sound of the first and second warnings described above. Moreover, this warning includes a visual indication that is brighter than the visual indication of the first and second warnings described above. The method 400 further includes block 432.

At block 432, the controller 112 determines a distance (i.e., distance D2) between the first proximity detector 160a (or another proximity detector 160 worn by a technician 150) and the third proximity detector 160c based on the first signal and the third signal. This is performed by consulting information stored in the memory 114 indicating a position of each sensing beacon 120, triangulating the first position P1 of the first proximity detector 160a and the second position P3 of the third proximity detector 160c based on the strength of signals received at each sensing beacon 120, and determining an amount of separation between the first position P1 and the second position P3. The memory 114 stores signals from the sensing beacons 120 as a part of this process. The sensing beacons 120 include cameras, and the angle of each camera and stereoscopic equipment or techniques are used in order to determine position. Motion detection techniques are used on distance data acquired over time to determine the current speed and/or direction of a technician 150 or machine 140. The method 400 then proceeds to block 434.

Once the distance (i.e., the distance D2) between the first proximity detector 160a and the third proximity detector 160c has been determined at block 432, this distance is compared to a threshold (i.e., a third threshold) at block 434.

The third threshold is stored on the memory 114. If the distance (i.e., the distance D2) is not less than the third threshold (e.g., a distance at which a safety warning will be provided to the technician 150), then the method 400 returns to block 432, and the proximity reporting system 100 determines new locations of the proximity detectors 160. Alternatively, if the distance (i.e., the distance D2) is less than the third threshold, the method 400 continues to block 436.

Block 436 includes directing or commanding the first proximity detector 160a to provide a warning (i.e., the first warning) to the first technician 150a in response to determining that the distance (i.e., the distance D2) between the first proximity detector 160a and the third proximity detector 160c is less than the third threshold. The distance thresholds described herein are statically defined on a per-machine basis, or are dynamically determined based on movements indicated in a Numerical Control (NC) program for the machine 140, and/or a position of the machine 140 within the NC program as the machine continues to operate. For example, if a path of a machine 140 in the future is expected to cause the machine 140 to reduce its distance to a technician 150, then the third threshold is increased to ensure that a warning is issued more quickly.

If the distance is not less than the third threshold, then the technician 150 is far away from the machine 140 and the machine 140 continues operations. Alternatively, if the distance is less than the third threshold, the controller 112 directs the first proximity detector 160a (e.g., via sensing beacons 120) via detection pathway 182 to activate the alarm 349 to provide a warning (i.e., a third warning) to the first technician 150a. That is, the third warning is provided through the detection pathway 182. Specifically, a transmission provided across the detection pathway 182 causes the first proximity detector 160a to alert the first technician 150a via any suitable indicator (e.g., a visual indicator, a sound, a vibration, etc.). The operating environment within the first cell 132 includes visual, auditory, and/or other stimuli that dulls the senses of the technician 150. Therefore, the warning is generated to stimulate multiple senses (e.g., via bright light, vibratory motion, and or distinctive sounds).

The third warning includes an indication of the direction of the third proximity detector 160c. The third warning takes the form of a verbal warning stating "halt movement forward," "do not move to the left," "do not move south," or similar phrases, depending on the location of the first technician 150a relative to the machine 140. The speakers 350 provide the verbal warning or sound. The third warning is implemented in the form of a flashing light on the helmet, glasses, face shield, or gloves of the technician, or as a flashing light or suitable visual indication. The visual indicator 361 is flashing lights at specific locations of the helmet, glasses, face shield, or gloves to indicate the direction of the location of another proximity detector 160. The third warning includes vibrations generated by the vibration generator 360. Regardless of its form, the third warning is a cue for the technicians 150 that encourages awareness of the location of the machine 140. The method 400 then proceeds to block 438.

At block 438, the distance (i.e., the distance D2) between the first proximity detector 160a and the third proximity detector 160c is compared to a threshold (i.e., a fourth threshold). The fourth threshold is stored on the memory 114. If the distance (i.e., the distance D2) is not less than the threshold (e.g., a distance at which a safety warning will be provided to the technician 150), then the method 400 returns to block 432, and the proximity reporting system 100 determines new locations of the proximity detectors 160. Alternatively, if the distance (i.e., the distance D2) is less than the fourth threshold, the method 400 continues to block 440. The fourth threshold is less than the third threshold.

At block 440, if the distance (i.e., the distance D2) between the first proximity detector 160a and the third proximity detector 160c is less than the fourth threshold, then the controller 112 directs the machine 140 to halt movement. This provides a technical benefit by ensuring that the technician remains safe, even when they move close to an actively operating machine. This also provides a technical benefit because it does not require each machine 140 to include its own dedicated technician avoidance sensors and logic.

The method 400 is performed for multiple sets of proximity detectors 160 substantially concurrently and asynchronously. For example, the method 400 is performed to determine additional distances between the proximity detector 160 of the technician 150 and proximity detectors 160 at the machines 140 or technicians 150. This enables proximity detection to be performed for all relevant entities within a manufacturing cell, or even across an entire factory floor. The method 400 further provides a technical benefit by preventing obscuring objects 170, such as large parts, from rendering a technician 150 undetectable.

Any of the various control elements (e.g., electrical or electronic components) shown in the figures or described herein are implemented as hardware, a processor implementing software, a processor implementing firmware, or some combination of these. For example, an element is implemented as dedicated hardware. Dedicated hardware elements are referred to as "processors", "controllers", or some similar terminology. When provided by a processor, the functions are provided by a single dedicated processor, by a single shared processor, or by a plurality of individual processors, some of which are shared. Moreover, explicit use of the terms "processor" or "controller" should not be construed to refer exclusively to hardware capable of executing software, and implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element is implemented as instructions executable by a processor or a computer to perform the functions of the element. Some examples of instructions are software, program code, and firmware. The instructions are operational when executed by the processor to direct the processor to perform the functions of the element. The instructions are stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for reporting proximity between technicians in an assembly environment, comprising:
    transmitting a plurality of first detection pulses from a first proximity detector to a plurality of sensing beacons;
    transmitting a plurality of second detection pulses from a second proximity detector to the plurality of sensing beacons;
    monitoring, by a proximity server, a first distance between the first proximity detector and the second proximity detector based on a first triangulation of the plurality of first detection pulses and a second triangulation of the plurality of second detection pulses;
    transmitting a plurality of first position pulses based on a plurality of first locations of the first proximity detector as measured by a first internal measurement unit in the first proximity detector, wherein the plurality of first position pulses are transmitted at a higher sampling rate than the plurality of first detection pulses;
    transmitting a plurality of second position pulses based on a plurality of second locations of the second proximity detector as measured by a second internal measurement unit in the second proximity detector, wherein the plurality of second position pulses are transmitted at the sampling higher rate than the plurality of second detection pulses; and
    monitoring, by the proximity server, the first distance between the first proximity detector and the second proximity detector based on the plurality of first position pulses and the plurality of second position pulses during a plurality of lulls between a plurality of receptions at the sensing beacon of the plurality of first detection pulses and the plurality of second detection pulses.

2. The method of claim 1, further comprising:
determining whether the first distance between the first proximity detector and the second proximity detector is less than a first threshold.

3. The method of claim 2, further comprising:
providing, using the first proximity detector, a first warning to a first technician in response to the determining that the first distance between the first proximity detector and the second proximity detector is less than the first threshold.

4. The method of claim 3, wherein:
the first proximity detector is worn by the first technician; and
the second proximity detector is worn by a second technician.

5. The method of claim 4, further comprising:
providing, using the second proximity detector, a second warning to the second technician in response to determining that the first distance between the first proximity detector and the second proximity detector is less than the first threshold, wherein the first warning and the second warning are provided concurrently.

6. The method of claim 5, wherein:
the first warning includes indicating a first direction of a second current location of the plurality of second locations of the second proximity detector when the first warning is provided; and
the second warning includes indicating a second direction of a first current location of the plurality of first locations of the first proximity detector when the second warning is provided.

7. The method of claim 4, further comprising:
receiving, by the plurality of sensing beacons, a plurality of third detection pulses from a third proximity detector disposed at a machine that moves within a cell of the assembly environment.

8. The method of claim 7, further comprising:
determining a second distance between the first proximity detector and the third proximity detector based on the first triangulation of the first signal and a third triangulation of the third signal.

9. The method of claim 8, further comprising
providing a second warning, using the first proximity detector, to the first technician in response to determining that the second distance between the first proximity detector and the third proximity detector is less than a second threshold.

10. The method of claim 9, further comprising:
commanding the machine to halt movement in response to determining that the second distance between the first proximity detector and the third proximity detector is less than a third threshold, wherein the third threshold is less than the second threshold.

11. A system for proximity reporting in an assembly environment, the system comprising:
a plurality of sensing beacons;
a first proximity detector, the first proximity detector being configured to:
  be worn by a first technician;
  transmit a plurality of first detection pulses to the plurality of sensing beacons; and
  transmit a plurality of first position pulses based on a plurality of first locations of the first proximity detector as measured by a first internal measurement unit in the first proximity detector, wherein the plurality of first position pulses are transmitted at a higher sampling rate than the plurality of first detection pulses;
a second proximity detector, the second proximity detector being configured to:
  be worn by a second technician;
  transmit a plurality of second detection pulses to the plurality of sensing beacons; and
  transmit a plurality of second position pulses based on a plurality of second locations of the second proximity detctor as measured by a second internal measurement unit in the second proximity detector, wherein the plurality of second position pulses are transmitted at the higher sampling rate than the plurality of second detection pulses; and
a proximity server in communication with the plurality of sensing beacons, wherein the proximity server is programmed to:
  monitor a first distance between the first proximity detector and the second proximity detector based on a first triangulation of the plurality of first detection pulses and a second triangulation of the plurality of second detection pulses; and
  monitor the first distance between the first proximity detector and the second proximity detector based on the plurality of first position pulses and the plurality of second position pulses during a plurality of lulls between a plurality of receptions at the plurality of sensing beacons of the plurality of first detection pulses and the plurality of second detection pulses.

12. The system of claim 11, wherein the proximity server is further programmed to:
determine whether the first distance between the first proximity detector and the second proximity detector is less than a first threshold.

13. The system of claim 12, wherein the proximity server is further programmed to:
command the first proximity detector to provide a first warning to the first technician in response to determining that the first distance between the first proximity detector and the second proximity detector is less than the first threshold.

14. The system of claim 13, further comprising:
one or more reflectors between the plurality of sensing beacons and one or more of the first proximity detector, and the second proximity detector.

15. The system of claim 14, wherein:
the first proximity detector includes a first transceiver configured to transmit the plurality of first detection pulses to the plurality of sensing beacons.

16. A wearable article, comprising:
an article body; and
a first proximity detector attached to the article body, wherein the first proximity detector includes:
  a first internal measurement unit configured to measure a plurality of first locations of the first proximity detector; and
  a first transceiver in communication with the first internal measurement unit and configured to
    transmit a plurality of first detection pulses to a plurality of sensing beacons; and
    transmit a plurality of first position pulses based on the plurality of first locations of the first proximity detector as measured by the first internal measurement unit, wherein the plurality of first position pulses are transmitted at a higher sampling rate than the plurality of first detection pulses.

17. The wearable article of claim 16, wherein:
the first transceiver is further configured to receive data indicative that a first distance between the first proximity detector and a second proximity detector is less than a first threshold.

18. The wearable article of claim 17, further comprising:
a first alarm coupled to the first transceiver, wherein the first alarm is configured to provide a first warning in response to receiving the data indicative that the first distance between the first proximity detector and the second proximity detector is less than the first threshold.

19. The wearable article of claim 18, wherein:
the first proximity detector is further configured to indicate a direction of the second proximity detector relative to the first proximity detector.

20. The wearable article of claim 17, wherein:
the first proximity detector is configured to receive the data indicative that the first distance between the first proximity detector and the second proximity detector is less than the first threshold from a proximity server; and
the proximity server is programmed to determine whether the first distance between the first proximity detector and the second proximity detector is less than the first threshold based on a first triangulation of the plurality of first detection pulses and a second triangulation of a plurality of second detection pulses generated by the second proximity detector.

* * * * *

UNITED STATES PATENT AND TRADEMARK OFFICE
CERTIFICATE OF CORRECTION

PATENT NO. : 12,030,669 B2
APPLICATION NO. : 17/527052
DATED : July 9, 2024
INVENTOR(S) : Fei Cai and Farahnaz Sisco Page 1 of 1

It is certified that error appears in the above-identified patent and that said Letters Patent is hereby corrected as shown below:

In the Claims

Claim 11, Column 23, Line 40: "detctor" should read --detector--.

Signed and Sealed this
Thirty-first Day of December, 2024

Derrick Brent
*Acting Director of the United States Patent and Trademark Office*